Feb. 12, 1963
N. E. WAYT
3,077,248
BRAKE ACTUATOR
Filed Oct. 18, 1960
2 Sheets-Sheet 1
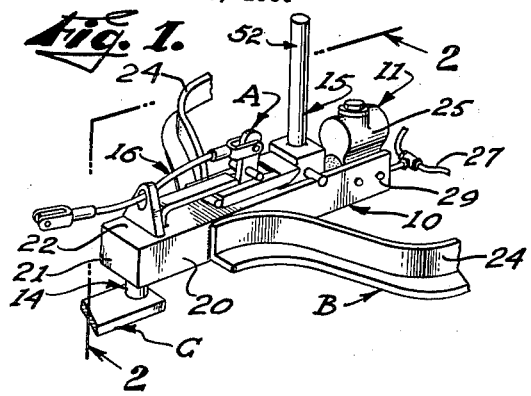
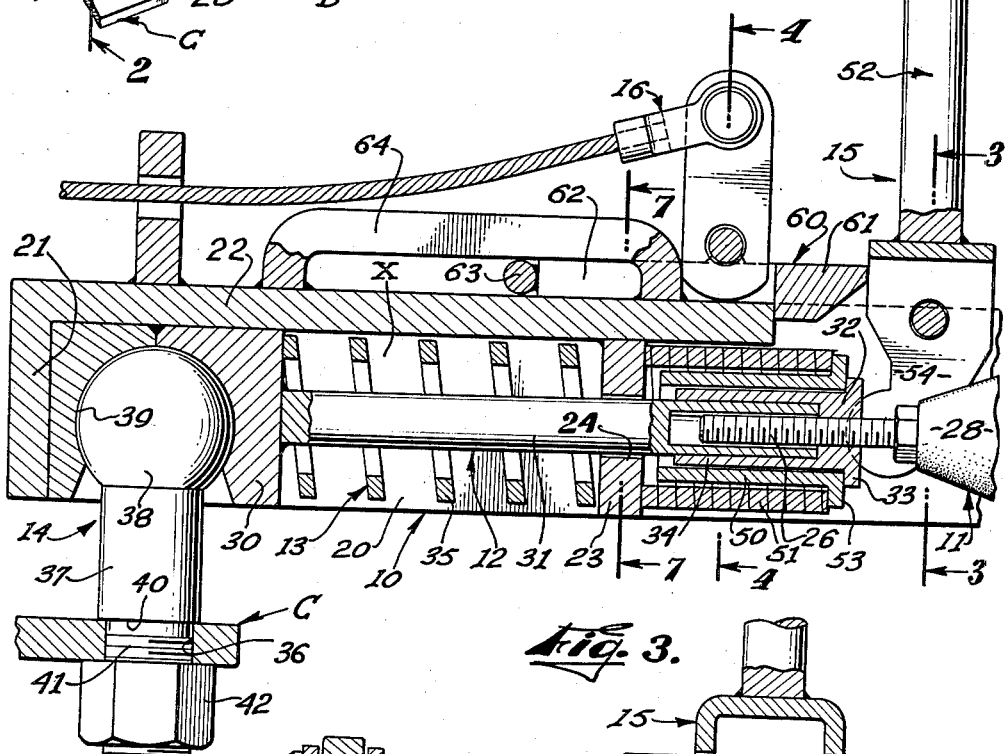
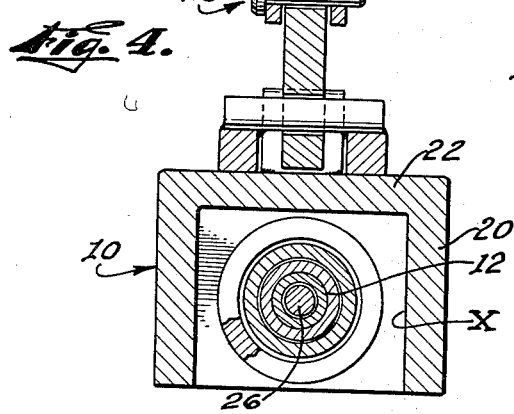
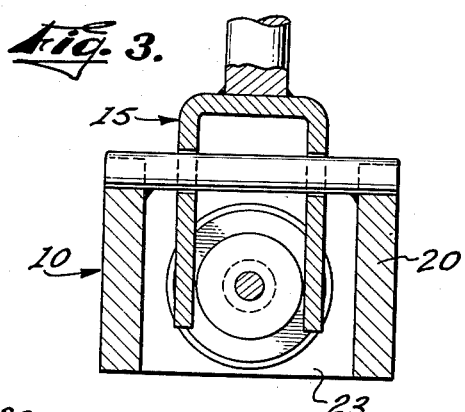
INVENTOR.
NEWELL E. WAYT
BY
*George A. Maxwell*
AGENT Feb. 12, 1963
N. E. WAYT
3,077,248
BRAKE ACTUATOR
Filed Oct. 18, 1960
2 Sheets-Sheet 2
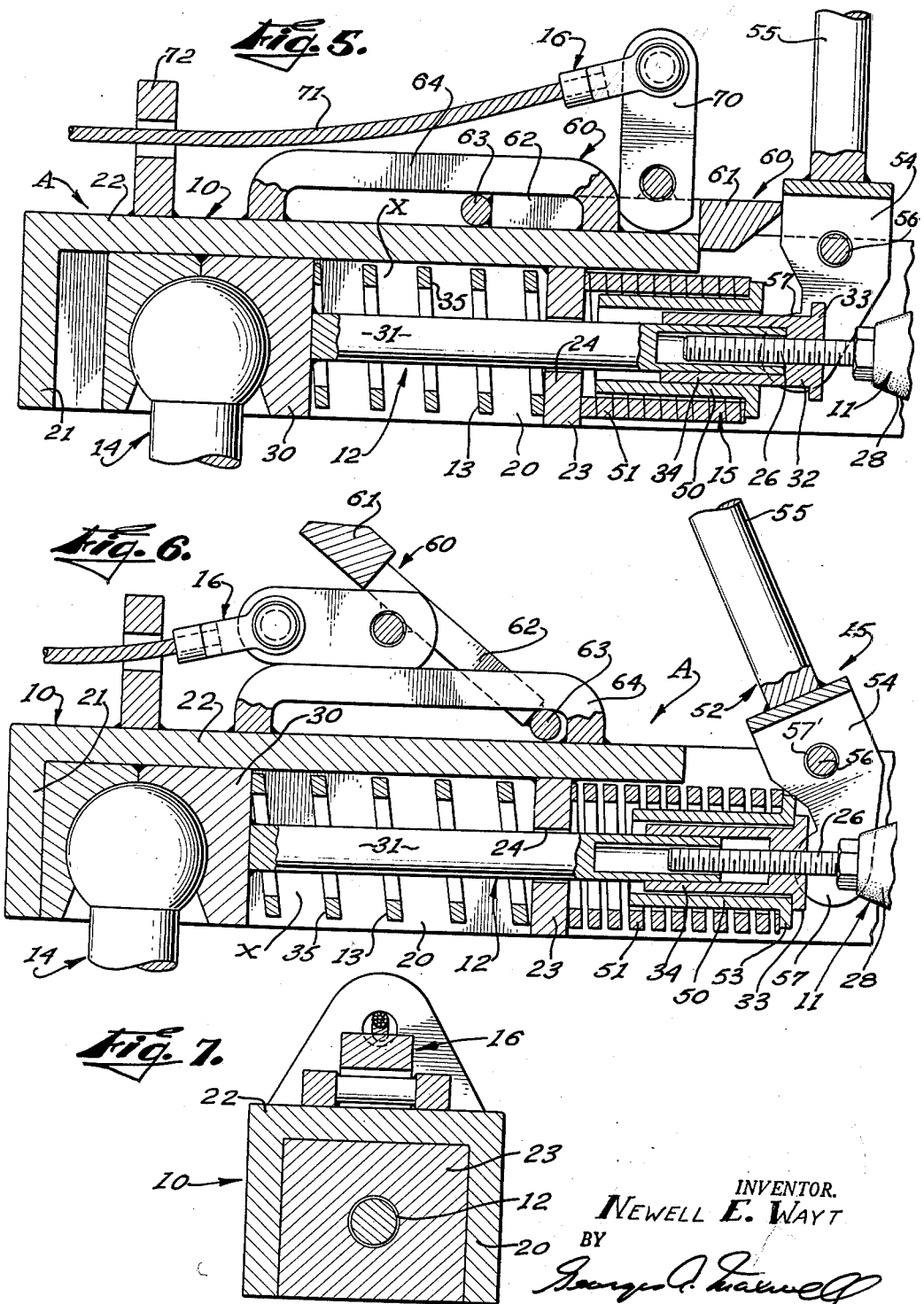
INVENTOR.
NEWELL E. WAYT
BY
AGENT

United States Patent Office 3,077,248
Patented Feb. 12, 1963

3,077,248
BRAKE ACTUATOR
Newell E. Wayt, 815 Arlington Ave., Torrance, Calif.
Filed Oct. 18, 1960, Ser. No. 63,401
5 Claims. (Cl. 188—112)

This invention relates to a braking mechanism and is more particularly concerned with a master brake cylinder actuator for a trailer braking mechanism.

House trailers and other similar trailers carrying cargos and the like, and which are adapted to be drawn by automobiles are extremely difficult and hazardous to brake and/or slow down. The braking, slowing down and stopping of a trailer becomes increasingly more dangerous and difficult as the weight of the trailer and the speed at which it is being drawn is increased.

Heretofore, pneumatic and electric brake actuating means have been provided for trailers, which means are independent of the automobile or draft vehicle, and are controlled by a manually operated remote control unit placed in the draft vehicle where it is accessible to the operator or driver of the vehicle. Such systems, however, are wanting in that they present a separate and usually unfamiliar operation for the driver of the vehicle to perform, each time it is required to slow down and/or stop the automobile and trailer. Still further, such systems require the development of a great skill on the part of the driver in that the forces applied to both the automobile and trailer braking systems must be properly balanced or proportioned in order to prevent excessive brake wear or jack knifing of the trailer.

Another difficulty presented by the ordinary trailer braking system is the fact that the automobile to which the trailer is hitched must be especially equipped to provide the required operating energy, be it electricity, pneumatics or hydraulics, and is such that when the trailer is not hitched and the braking system is not connected with the required source of operating energy, the braking system is inoperative.

An object of the present invention is to provide an actuator for the master hydraulic brake cylinder of a trailer braking system, which actuator is incorporated in the trailer hitch and is responsive to the force exerted through the hitch and into the draft vehicle by the trailer, when the draft vehicle is being braked and slowed down.

Another object of the present invention is to provide a brake actuator of the character referred to having a manual control means that can be employed when the trailer is unhitched or disconnected from the draft vehicle.

A further object of this invention is to provide an actuator of the character referred to having an emergency release for the manual control means whereby the master cylinder is actuated to set the brakes when the trailer becomes accidentally unhitched from the draft vehicle.

It is an object of my invention to provide an actuator of the character referred to which is highly effective and dependable in operation and which is both easy and economical of manufacture.

The various objects and features of my invention will be fully understood from the following detailed description of a typical preferred form and application of my invention, throughout which description reference is made to the accompanying drawings, in which:

FIG. 1 is a perspective view of the master brake cylinder actuator that I provide and showing is related to the tongue of a trailer and the hitch of a draft vehicle.

FIG. 2 is an enlarged detailed sectional view of the actuator provided by the present invention and taken as indicated by line 2—2 on FIG. 1.

FIG. 3 is a transverse sectional view taken as indicated by line 3—3 on FIG. 2.

FIG. 4 is a transverse sectional view as indicated by line 4—4 on FIG. 2.

FIG. 5 is a view similar to FIG. 2 and showing the actuator of the present invention in an actuated position.

FIG. 6 is a view similar to FIGS. 2 and 5 showing the actuator that I provide in yet another position.

FIG. 7 is a transverse sectional view taken as indicated by line 7—7 on FIG. 2.

The actuator A that I provide is adapted to be engaged or arranged between the draft tongue B on the trailer to which it is related and the hitch C provided on the draft vehicle. In the drawings, I have not shown the trailer, or the draft vehicle, it being understood that the trailer can be of conventional construction and that the draft vehicle can be a standard type automobile or truck.

The actuator A is shown as including generally, a frame 10 fixed to the trailer tongue B, a master brake cylinder unit 11 carried by the frame, a driver means 12 shiftably carried by the frame and related to the cylinder unit 11, spring means 13 normally yieldingly urging the driver means to an unactuated position, and universal coupling means 14 between the driver means and the hitch C on the draft vehicle.

The actuator A that I provide is shown as further including a spring loaded manual operating means 15 related to the cylinder unit, frame and driver, and a safety release means 16 related to the manually operating means and the draft vehicle.

The frame 10 of the actuator A that I provide is an elongate horizontally disposed member having front and rear ends and is preferably fabricated of steel plate. The frame 10 is shown as having a pair of laterally spaced elongate vertically disposed side walls 20, a vertically disposed front end wall 21 extending between the forward terminal ends of the side walls and a top wall 22 of limited longitudinal extent and continuing rearwardly from the front end of the body and terminating approximately midway between the ends of the side walls of the body. In addition to the foregoing, the body includes a vertically disposed partition 23 fixed to and extending between the side walls 20 at a point intermediate their ends. The partition 23 is provided with an aperture 24 adapted to freely pass a part of the driver means 12, as will hereinafter be described.

With the above relationship of parts, it will be apparent that the partition 23 and the top, front and side walls 22, 21 and 20 of the frame 10 cooperate to establish a downwardly opening, elongate channel X in the forward portion of the frame, while the side walls 20 of the frame project freely rearwardly to establish what can be termed the open rear portion of the frame.

The frame 10 is adapted to be secured to the forward end of the tongue B of the trailer to, in effect, become an integral part therewith and to extend in a plane parallel with the longitudinal axis of the trailer.

In the particular case illustrated, the trailer tongue B is shown as including a pair of laterally spaced, forwardly convergent arms 24, the forward ends of which are fixed to the side walls of the frame A, as by welding.

It is to be understood that the particular trailer tongue construction illustrated, and its relationship to the actuator A of the present invention, is only illustrative of one carrying out of the invention and that, in practice, the construction of the trailer tongue and the manner in which it is related to the actuator can vary widely without effecting the novelty of the present invention.

The master brake cylinder unit 11 of the present invention is a typical or conventional hydraulic master brake cylinder unit having a body 25 in which the piston, valves, and other components are engaged, an operating piston rod 26 projecting from one end of the body 25 and adapted to be engaged and shifted inwardly relative to the body to operate the unit, and suitable fluid conducting lines 27 connected with the unit and adapted to conduct fluid from the unit to the brake mechanisms in the wheels of the trailer.

The forward or free end portion of the piston rod 26 is externally threaded in accordance with normal brake cylinder constructions and a suitable protective rubber boot 28 is provided on the end of the unit body 25, from which the rod 26 projects, which boot engages and seals around the rod and prevents the passage of foreign matter into the unit, around the rod.

The cylinder unit 11 is arranged in the open rear portion of the frame 10 so that the piston rod 26 thereof projects forwardly and is in axial alignment with the aperture 24 in the partition 23 of the frame. The unit 11 is held in fixed position between the side walls 20 of the frame. In the case illustrated, the unit is fixed to the side walls 20 of the frame by means of suitable screw fasteners 29.

The driver means 12 of the actuator is shown including a block-like body 30 slidably engaged in the forward portion of the downwardly opening channel X in the forward portion of the frame, an elongate tubular stem 31 fixed to and projecting rearwardly from the body to project through the aperture 24 in the partition and to establish telescoping engagement with the piston rod of the unit 11. The means 12 further includes a drive sleeve 32 threadedly engaged on the piston rod and adapted to be engaged by the inner terminal end of the drive stem.

With the above relationship of parts, it will be apparent that when the body 30 of the driver means 12 is shifted rearwardly in the frame 10, in the manner illustrated in FIG. 5 of the drawings, it urges the sleeve 32 and the piston rod 26, on which the sleeve is engaged, rearwardly, thereby actuating the master brake cylinder unit and setting the brakes related thereto. It will also be apparent that suitable adjustment can be had or made between the stem 31 and the rod 26 by rotating and advancing or withdrawing the sleeve 32 on the piston rod.

In the form of the invention illustrated, the sleeve 32 is provided with a radially outwardly projecting flange 33 at its inner or rear end and has a forwardly projecting tubular extension 34 slidably engaged around the rear end portion of the driver stem. The flange 33 and the extension 34 on the sleeve 32 are adapted to cooperate with the manual operating means 15 in a manner that will hereinafter be described.

The spring means 13 which normally yieldingly urges the driver means 12 to an unactuated position involves a simple, helical compression spring 35 engaged around the stem to occur between and yieldingly engage the body 30 and the partition 23.

The hitch C on the draft vehicle is shown as a simple, flat, horizontally disposed, plate-like member having top and bottom surfaces and an opening 36 therein. The hitch C can, in practice, vary widely in form and construction and can be fixed to the draft vehicle in any suitable manner.

The universal coupling means 14 provided between the driver means 12 and the hitch C of the draft vehicle involves generally, a normally vertically disposed coupling pin 37 carried by the body 30 of the driver means to depend therefrom and to be connected with the hitch C.

In the case illustrated, the pin 37 is provided with a spherical head 38 at its upper end and the body 30 of the driver means is shown provided with a downwardly opening spherical cavity 39 in which the head 38 is engaged. With this relationship of parts, it will be apparent that the pin 37 is carried by the body 30 for free universal movement and allows for free rotation and pivoting of the trailer relative to the hitch C on the draft vehicle.

The lower end of the pin 37 terminates at a flat, downwardly facing shoulder 40, adapted to engage the top surface of the hitch C and has a depending extension 41 of reduced diameter, which extension projects through the aperture 36 in the hitch C and carried a suitable lock nut 42, which nut engages the bottom surface of the hitch and maintains the pin in fixed position therewith.

In practice, and if desired, the pin 37 can be fixed to or made integral with the body 30 and the hitch C can be provided with a socket member adapted to releasably engage a spherical enlargement provided on the lower end of the pin, without in any way affecting the novelty of the present invention.

With the construction thus far described, it will be apparent that when the trailer to which my brake actuator is related is being drawn behind the draft vehicle, the spring 35 yieldingly urges the body 30 and the stem 31 forwardly in the frame 10, and to a position where the brake cylinder unit 11 is unactuated. It will be further apparent, that when the draft vehicle is slowed up or braked, the momentum or inertia of the trailer causes the frame 10 and the cylinder unit 11 carried thereby to shift forwardly relative to the body 30 and the stem 31, against the resistance of the spring 35, with the result that the cylinder unit 11 is actuated and the brakes at the wheels of the trailer are set.

The manual operating means 15 provided by the present invention is shown as including, a collar 50 slidably engaged on the forwardly projecting tubular extension 34 on the sleeve 32 of the drive means, a spring 51 normally yieldingly urging the collar rearwardly and into driving engagement on the flange 33 on the sleeve, and a lever arm 52 pivotally carried by the frame and engageable with the collar, to urge the collar forwardly against the resistance of the spring 51.

The collar 50 of the means 15 is a simple, straight, cylindrical member surrounding and extending longitudinally of the extension 34 on the sleeve 32 and has a radially outwardly projecting flange 53 at its inner or rear terminal end. The flanged end of the collar 50 opposes and bears against the flange 33 on the sleeve 32.

The spring 51 is a simple, helical compression spring engaged about the exterior of the collar 50 to occur between and bear against the flange 33 on the collar and the rear side of the partition 23 in the frame 10.

The lever arm 52 is a fabricated member having a U-shaped lower portion with a pair of depending fingers 54 and a straight, normally vertically disposed upper portion establishing a handle 55.

The lever arm 52 is pivotally mounted in the rear open portion of the frame 10, rearwardly of the collar 50, by means of a pivot pin 56 fixed to and extending between the side walls 20 of the frame, adjacent the upper edges thereof. The pin 56 extends through a pair of axially aligned openings 57' in the upper portions of the fingers 54 of the lever arm. The fingers 54 of the lever arms occur at opposite side of and freely pass the sleeve and piston rod 32 and 26 and are provided at their lower ends with forwardly projecting, convex cams 57, which cams engage the rear side of the flange 53 on the collar.

The handle 55 of the lever arms projects freely upwardly from the frame where it can be easily and conveniently engaged by a person's hand.

With the relationship of parts set forth above, it will be apparent that the spring 51 of the means 15 normally yieldingly urges the collar 50 rearwardly and so that the collar engages the sleeve 32 and urges the piston rod which carried the sleeve rearwardly to actuate the braking system, as clearly illustrated in FIG. 6 of the drawings. When the collar is urged rearwardly in the manner set forth above, the lever arm is pivoted forwardly. By manually urging or pivoting the handle of the lever arm rearwardly, the collar 50 of the means 15 is urged forwardly against resistance of the spring 51 and out of engagement with the sleeve 32, thereby releasing the cylinder unit 11 and releasing the brakes.

In addition to the above, the manual operating means 15 further includes a suitable latch means 60, which means serves to hold the means 15 in an unactuated position when the trailer to which it is related is being towed by the draft vehicle. The latch means 60 is shown as including a lock bar 61 adapted to be releasably engaged between the rear end of the top wall 22 of the frame and the lower U-shaped portion of the lever arm 52, when the lever arm is in its forwardly or unactuated position, as clearly illustrated in FIG. 2 of the drawings. The latch means 60 further includes, a pair of laterally spaced arms 62 fixed to and projecting forwardly from the bar, a pivot rod 63 fixed to and extending between the forward terminal ends of the arms and an inverted U-shaped clip 64 engaged over the pivot rod 63 and fixed to the top wall 22 of the frame.

It will be apparent that by pivoting the arms 62 about the axis of the pivot rod 63 and relative to the clip 64, the lock bar 61 can be shifted into and out of engagement between the rear end of the top wall 22 of the frame and the lever arm 52, and the means 15 can be put into and out of operation as circumstances require.

In order that the lock bar 61 of the lock means 60 can be shifted out of position where it will not interfere with the operation of the lever arm 52, when the means 15 is being manually operated, the clip 64 is elongated, as clearly illustrated throughout the drawings. By elongating the clip 64 it is possible to pivot and slide the bar, arms and pivot rod 61, 62 and 63 of means 60 to the position shown in FIG. 6 of the drawings, and where it is out of the way of the handle 55 of the lever arm 52.

The safety release means 16 that I provide is related to the latch means 60 of the manually operating means 15 and includes a link 70 pivotally carried by the arms 62 of the means 60 to normally occur adjacent the rear end of the clip 64 on the top wall of the frame and to project upwardly therefrom, and a cable 71 fixed to and extending between the top or upper end of the link and the draft vehicle. In addition to the above, a suitable guide 72 is provided at the forward end of the frame 10 and through which the cable 71 is engaged to assure proper operation of the safety release means.

In operation, when the trailer accidently becomes unhitched from the draft vehicle, the cable 71 extending between the link 70 and the vehicle is drawn taut, pivoting the link 70 forwardly over the rear end of the clip 64 and thereby raising the lock bar 61 from engagement between the top wall of the frame 10 and the lever arm 62 of the manual actuating means 15, thereby releasing the means 15 and causing the trailer braking system to set and lock.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A brake actuator of the character referred to including, an elonagte substantially tubular frame, an apertured partition intermediate the ends of the frame, said frame being fixed to the tongue on a trailer to extend parallel therewith, a hydraulic master brake cylinder unit carried by the frame at the rear end thereof and having a forwardly projecting threaded piston rod, a flanged sleeve engaged on the piston rod, a block-like body slidably engaged in the forward portion of the frame and having a rearwardly projecting tubular drive stem projecting through the partition to telescopically engage the piston rod and engage the sleeve, a compression spring between the body and the partition normally yieldingly urging the body forwardly in the frame and the stem away from the sleeve, universal coupling means securing the body to a trailer hitch on a draft vehicle and manual operating means including a flanged collar slidably engaged on the sleeve, a compression spring between the partition and the flange on the collar and normally yieldingly urging the collar rearwardly into driving engagement with the flange on the sleeve, to actuate the cylinder unit, a lever arm pivotally carried by the frame to engage the flange and the collar and manually operable to shift the collar forwardly against the resistance of the second mentioned spring and latch means carried by the frame and engageable with the lever arm to hold said lever arm in a locked position.

2. A brake actuator of the character referred to including, an elongate frame, an apertured partition intermediate the ends of the frame, said frame being fixed to the tongue on a trailer to extend parallel therewith, a hydraulic master brake cylinder unit carried by the frame at the rear end thereof and having a forwardly projecting threaded piston rod, a flanged sleeve engaged on the piston rod, a block-like body slidably engaged in the forward portion of the frame and having a rearwardly projecting tubular drive stem projecting through the partition to telescopically engage the piston rod and engage the sleeve, a compression spring between the body and the partition normally yieldingly urging the body forwardly in the frame and the stem away from the sleeve, coupling means securing the body to a trailer hitch on a draft vehicle and manual operating means including a flanged collar slidably engaged on the sleeve, a compression spring between the partition and the flange on the collar and normally yieldingly urging the collar rearwardly into driving engagement with the flange on the sleeve to actuate the cylinder unit, a lever arm pivotally carried by the frame to engage the flange and the collar and manually operable to shift the collar forwardly against the resistance of the second mentioned spring, latch means carried by the frame and engageable with the lever arm to hold said lever arm in a locked position, and safety release means and including a flexible cable fixed to and extending between the latch means and the vehicle and adapted to disengage the latch from the lever arm when drawn taut.

3. A brake actuator of the character referred to including, an elongate frame, an apertured partition intermediate the ends of the frame, said frame being fixed to the tongue on a trailer to extend parallel therewith, a hydraulic master brake cylinder unit carried by the frame at the rear end of the frame and having a forwardly projecting threaded piston rod, a flanged sleeve engaged on the piston rod, a block-like body with a downwardly opening cavity slidably engaged in the forward portion frame and having a rearwardly projecting tubular drive stem projetcing through the partition to telescopically engage the piston rod and engage the sleeve, a compression spring between the body and the partition normally yieldingly urging the body forwardly in the frame and the stem away from the sleeve, universal coupling means securing the body to a trailer hitch on a draft vehicle and manual operating means including a flanged collar slidably engaged on the sleeve, a compression spring between the partition and the flange on the collar and normally yieldingly urging the collar rearwardly into driving engagement with the flange on the sleeve, to actuate the cylinder unit, a lever arm pivotally carried by the frame to engage the flange and the collar and manually operable to shift the collar forwardly against the resistance of the second mentioned spring and latch means carried by the frame and engageable with the lever arm to hold said lever arm in a locked position, said coupling means including a normally vertically disposed pin with a head at its upper end engaged in the cavity in the body and a threaded extension at its lower end engaged in the trailer hitch.

4. A brake actuator of the character referred to including, an elongate frame having straight, parallel side walls, a front end wall, an apertured partition intermediate the ends of the side walls and a top wall extending between the partition and the front wall, said top, side and end walls and said partition defining an elongate, downwardly opening channel, said frame being fixed to the tongue and a trailer to extend parallel therewith, a hydraulic master brake cylinder unit carried by the frame between the side walls at the rear end of the frame and having a forwardly projecting threaded piston rod, a flanged sleeve engaged on the piston rod, a block-like body slidably engaged in the channel in the frame and having a rearwardly projecting tubular drive stem projecting through the partition to telescopically engage the piston rod and engage the sleeve, a compression spring between the body and the partition normally yieldingly urging the body forwardly in the channel and the stem away from the sleeve, coupling therewith, a hydraulic master brake cylinder unit carried by the frame between the side walls at the rear end of the frame and having a forwardly projecting threaded piston rod, a flanged sleeve engaged on the piston rod, a block-like body slidably engaged in the channel in the frame and having a rearwardly projecting tubular drive stem projecting through the partition to telescopically engage the piston rod and engage the sleeve, a compression spring between the body and the partition normally yieldingly urging the body forwardly in the channel and the stem away from the sleeve, coupling means securing the body to a trailer hitch on a draft vehicle and manual operating means including a flanged collar slidably engaged on the sleeve, a compression spring between the partition and the flange on the collar and normally yieldingly urging the collar rearwardly into driving engagement with the flange on the sleeve, to actuate the cylinder unit, a lever arm pivotally carried by the frame to engage the flange and the collar and manually operable to shift the collar forwardly against the resistance of the second mentioned spring, latch means carried by the frame and engageable with the lever arm to hold said lever arm in a locked position, said latch means including an elongate laterally disposed lock bar engageable between the lever arm and the rear end of the top wall of the frame when the lever arm is in the locked position, a pair of arms projecting rearwardly from the ends of the lock bar and pivotally secured to the top wall of the body, and safety release means for the lever arm and including a flexible cable fixed to and extending between the latch means and the vehicle and adapted to disengage the latch from the lever arm when drawn taut.

5. A brake actuator of the character referred to including, an elongate frame having straight, parallel side walls, a front end wall, an apertured partition intermediate the ends of the side walls and a top wall extending between the partition and the front wall, said top, side and end walls and said partition defining an elongate, downwardly opening channel, said frame being fixed to the tongue on a trailer to extend parallel therewith, a hydraulic master brake cylinder unit carried by the frame between the side walls at the rear end of the frame and having a forwardly projecting threaded piston rod, a flanged sleeve engaged on the piston rod, a block-like body slidably engaged in the channel in the frame and having a rearwardly projecting tubular drive stem projecting through the partition to telescopically engage the piston rod and engage the sleeve, a compression spring between the body and the partition normally yieldingly urging the body forwardly in the channel and the stem away from the sleeve, coupling means securing the body to a trailer hitch on a draft vehicle and manual operating means including a flanged collar slidably engaged on the sleeve, a compression spring between the partition and the flange on the collar and normally yieldingly urging the collar on the sleeve, to actuate the cylinder unit, a lever arm pivotally carried by the frame to engage the flange and the collar and manually operable to shift the collar forwardly against the resistance of the second mentioned spring, latch means carried by the frame and engageable with the lever arm to hold said lever arm in a locked position, said latch means including an elongate laterally disposed lock bar engageable between the lever arm and the rear end of the top wall of the frame when the lever arm is in the locked position, a pair of arms projecting rearwardly from the ends of the lock bar and pivotally secured to the top wall of the body, and safety release means for the lever arm and including a flexible cable fixed to and extending between the latch means and the vehicle and adapted to disengage the latch from the lever arm when drawn taut.

References Cited in the file of this patent

UNITED STATES PATENTS

| | | |
|---|---|---|
| 2,134,931 | Salerno | Nov. 1, 1938 |
| 2,138,267 | Christenson | Nov. 29, 1938 |
| 2,261,220 | Brown | Nov. 4, 1941 |
| 2,483,074 | Swain | Sept. 27, 1949 |
| 2,704,585 | Stromberg | Mar. 22, 1955 |
| 2,834,436 | Davids | May 13, 1958 |
| 2,956,648 | McDaniel | Oct. 18, 1960 |
| 2,960,194 | Stromberg | Nov. 15, 1960 |